United States Patent
Kwok et al.

[11] Patent Number: 6,088,044
[45] Date of Patent: Jul. 11, 2000

[54] METHOD FOR PARALLELIZING SOFTWARE GRAPHICS GEOMETRY PIPELINE RENDERING

[75] Inventors: Thomas Yu-Kiu Kwok, Washington Township, N.J.; Chandrasekhar Narayanaswami, Wilton, Conn.; Bengt-Olaf Schneider, Yorktown Heights, N.Y.

[73] Assignee: International Business Machines Corporation, Armonk, N.Y.

[21] Appl. No.: 09/087,093

[22] Filed: May 29, 1998

[51] Int. Cl.[7] .................................................. G06F 15/80
[52] U.S. Cl. ........................ 345/505; 345/504; 709/100; 712/28
[58] Field of Search .................................. 345/504–506, 345/507–509; 709/100, 107, 208–211; 712/28, 31

[56] References Cited

U.S. PATENT DOCUMENTS

| | | | |
|---|---|---|---|
| 4,805,116 | 2/1989 | Liang et al. | 364/521 |
| 4,876,644 | 10/1989 | Nuechterlein et al. | 364/200 |
| 5,818,469 | 10/1998 | Lawless et al. | 345/522 |
| 5,838,976 | 11/1998 | Summers | 395/704 |
| 5,951,672 | 9/1999 | Kwok et al. | 712/28 |

Primary Examiner—Kee M. Tung
Attorney, Agent, or Firm—Jay P. Sbrollini; Perman & Green, LLP

[57] ABSTRACT

In a multiprocessor system, such as a graphics data processing system, a method is disclosed for processing input data in a data processor pipeline. The method includes steps of operating a main thread to store input data in an input buffer until the input buffer is full or the input data ends. If a child thread does not exist, the method creates a child thread and assigns the input buffer to the child thread for processing. If a child thread already exists, the method determines if the child thread can be assigned the input buffer and, if so, then assigns the input buffer to the child thread for processing. If the child thread cannot be assigned the input buffer for processing, the main thread assigns the input buffer to itself for processing in parallel with processing being performed by the child thread. The steps of assigning and determining employ local variables that are accessible to both the main thread and the child thread, and that do not require an operating system call to change and/or test. The method includes a further step of sending a processed data buffer to a subsequent processing stage of the pipeline, such as a rasterizer unit. In a preferred embodiment the step of sending is executed only by the child thread, whether the data buffer was processed by the child thread or by the main thread.

14 Claims, 10 Drawing Sheets

METHOD FOR PARALLELIZING SOFTWARE GRAPHICS GEOMETRY PIPELINE RENDERING

CROSS-REFERENCE TO A RELATED PATENT APPLICATION

This patent application is related to copending and commonly assigned U.S. patent application Ser. No. 08/887,110, filed on Jul. 2, 1997, entitled "Improved Synchronization Method for Work Distribution in a Multiprocessor System", now U.S. Pat. No. 5,951,672, by Thomas Y. Kwok, Chandrasekhar Narayanaswami and Bengt-Olaf Schneider.

FIELD OF THE INVENTION

The invention relates generally to data processing systems containing a plurality of data processors (i.e., multiprocessor systems) and, in particular, to methods for parallelizing and distributing work assignments in multiprocessor systems.

BACKGROUND OF THE INVENTION

Figure 1:
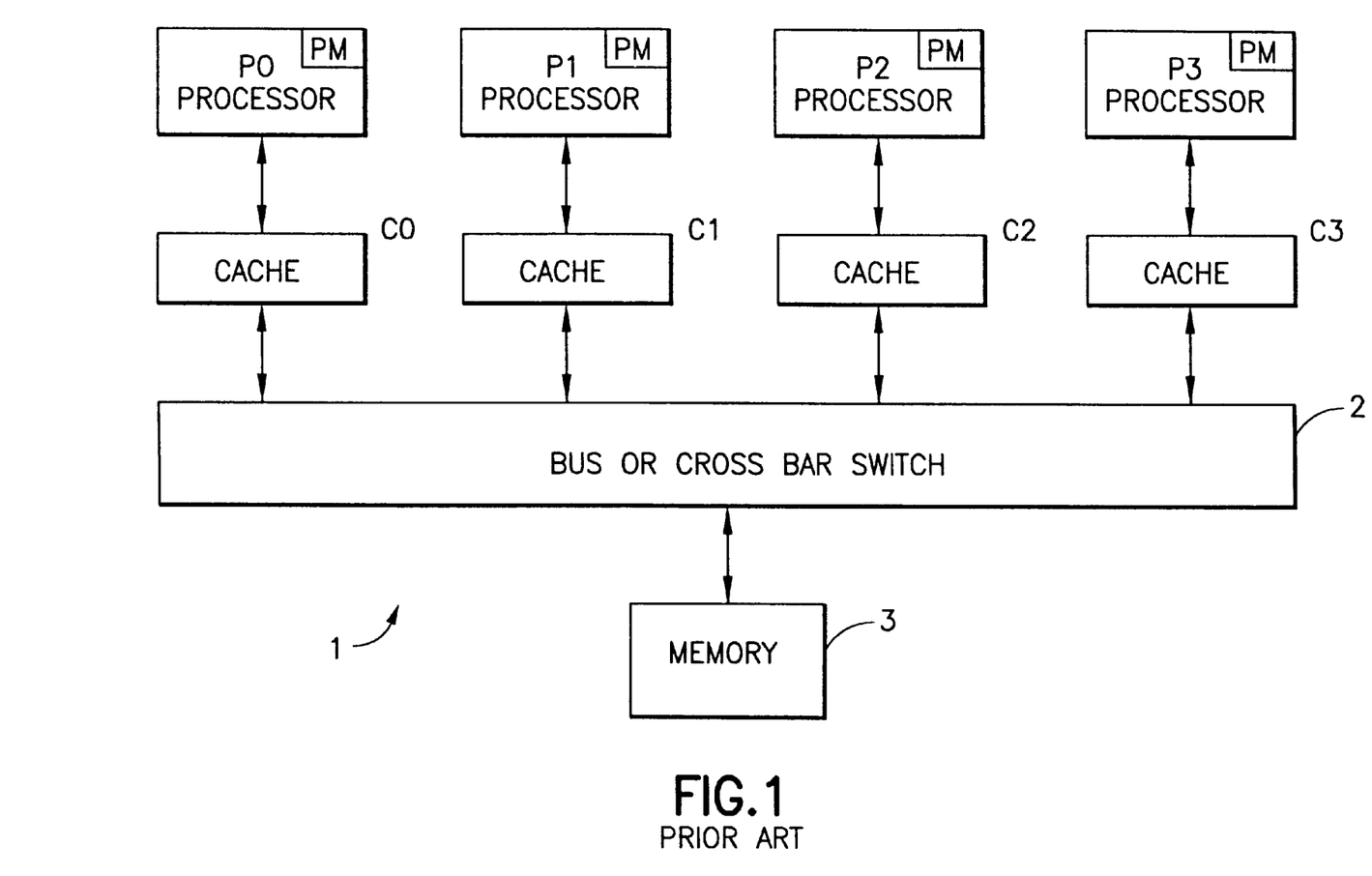
FIG. 1 is a functional block diagram of a conventional multiprocessor system that may be utilized by the preferred embodiment of this invention.

Referring to FIG. 1, a multiprocessor 1 is a machine containing more than one data processor (e.g., P0–P3). The data processors may be connected to each other by a bus or by a cross bar switch 2. Each of the processors may have an associated cache memory (C0–C3). The processors P0–P3 share a common system memory 3 through the bus or cross bar switch 2 and the associated cache (if provided). Each processor may also have a private memory (PM) that is not accessible to the other processors.

Each of the processors P0–P3 of the multiprocessor 1 may execute an associated task. For example, an audio application or task may run on one processor while a video application may run on another processor. In this case each processor executes its task in a substantially independent manner without any strong interaction between the tasks running on the other processors.

In other cases, of most interest to this invention, a single task is partitioned into sub-tasks that are then executed cooperatively on two or more processors by assigning one processor to one sub-task. When several processors cooperate in this manner to execute a single task, they typically need to share, in a fair manner, common resources such as the memory 3, as well as buffers, printers, and other peripherals (not shown). In addition, the processors typically need to communicate with one another so as to share information needed at checkpoints, to wait for other processors to complete a certain routine, to signal to other processors that the processor has completed its assigned sub-task, etc.

A "thread" is the analog of a process in an environment where several tasks can be spawned by a single process. More specifically, a thread is one of a set of subprocesses that share a single address space. In this case off-stack (global) variables are shared among all the threads of a given program. Each thread executes a separate call stack having its own separate local variables. All threads within a given process share system resources, such as a process id, a process group id, a session membership, a real, effective and saved set user id, a real, effective and saved set groups id, supplementary group ids, a current working directory, a root directory, a file mode creation mask, and file descriptors. The foregoing list of system resources is exemplary, and not all of these resources may be used in a given application, or more than these listed resources may be used. A thread that is the only member of its subprocess group is equivalent to a process.

A kernel thread refers to the execution of the thread in a kernel space, typically considered in the art to be a privileged space not accessible to user applications. A user thread refers to the execution of the thread in user space. In a threaded environment, m user threads may be mapped on to n kernel threads.

A thread-safe library is one which contains thread-safe functions. A thread-safe function is one which may be safely invoked concurrently by multiple threads. A reentrant function in a thread-safe environment is a function whose effect, when called by two or more threads, is guaranteed to be as if the threads executed the function one after another in an undefined order, even if the actual execution is interleaved. Library functions must be re-entrant for the library to be considered thread-safe.

Currently available thread software packages typically have functions to create a thread and to begin the execution of some function. A newly created thread finishes when the function it executes finishes, or when the thread is explicitly terminated. Thread packages also typically provide a variety of synchronization primitives, such as those used for mutual exclusion such as mutexes, condition variables and semaphores, waiting for events to be posted from other threads, posting events to other threads, etc. Specific details of these thread-related concepts may be obtained from "Operating Systems Principles", Prentice Hall 1973, by Per Brinch Hansen, or from "Cooperating Sequential Processes", Technical Report Technological University 1965, by E. W. Djikstra.

It should be noted that while creating and destroying threads is less computationally expensive than creating and destroying processes, it is still not efficient to create and destroy threads at a fine granularity, wherein small pieces of work or tasks are executed in parallel and may require a high degree synchronization and communication.

A synchronization operation is implied when two or more threads have to share a resource. For example, assume that a thread A is inserting work items into a work buffer that is processed by a thread B. After inserting a work item, thread A increments a count of the work items in the buffer. Similarly, after processing a work item, thread B decrements the count of the work items in the buffer. Assume for this example that the buffer can hold 100 work items, and that the counter is currently at 58. Assume now further that thread A begins to increment the count from 58 to 59, and at the same time thread B begins to decrement the count from 58 to 57. If thread B finishes the decrement operation later, the counter is at 57, if thread A finishes the increment operation later the counter is at 59. Neither counter value is correct, as the correct value is 58. This problem occurs because both thread A and thread B are allowed to operate on the counter at the same time. This is referred to in the art as a synchronization problem. The solution to this problem is to disallow thread B from modifying the counter when thread A is modifying the counter, and vice-versa. Traditional solutions to this problem have resorted to the use of mutual exclusion primitives provided by the operating system. One drawback to this technique is that it involves a system call operation, which can require several tens of processor cycles to execute. As a result, the use of mutual exclusion primitives is not suitable when the work item is small, since the overhead of using the mutual exclusion primitives negates any benefit that can be obtained by using two threads to perform the work.

Figure 2:
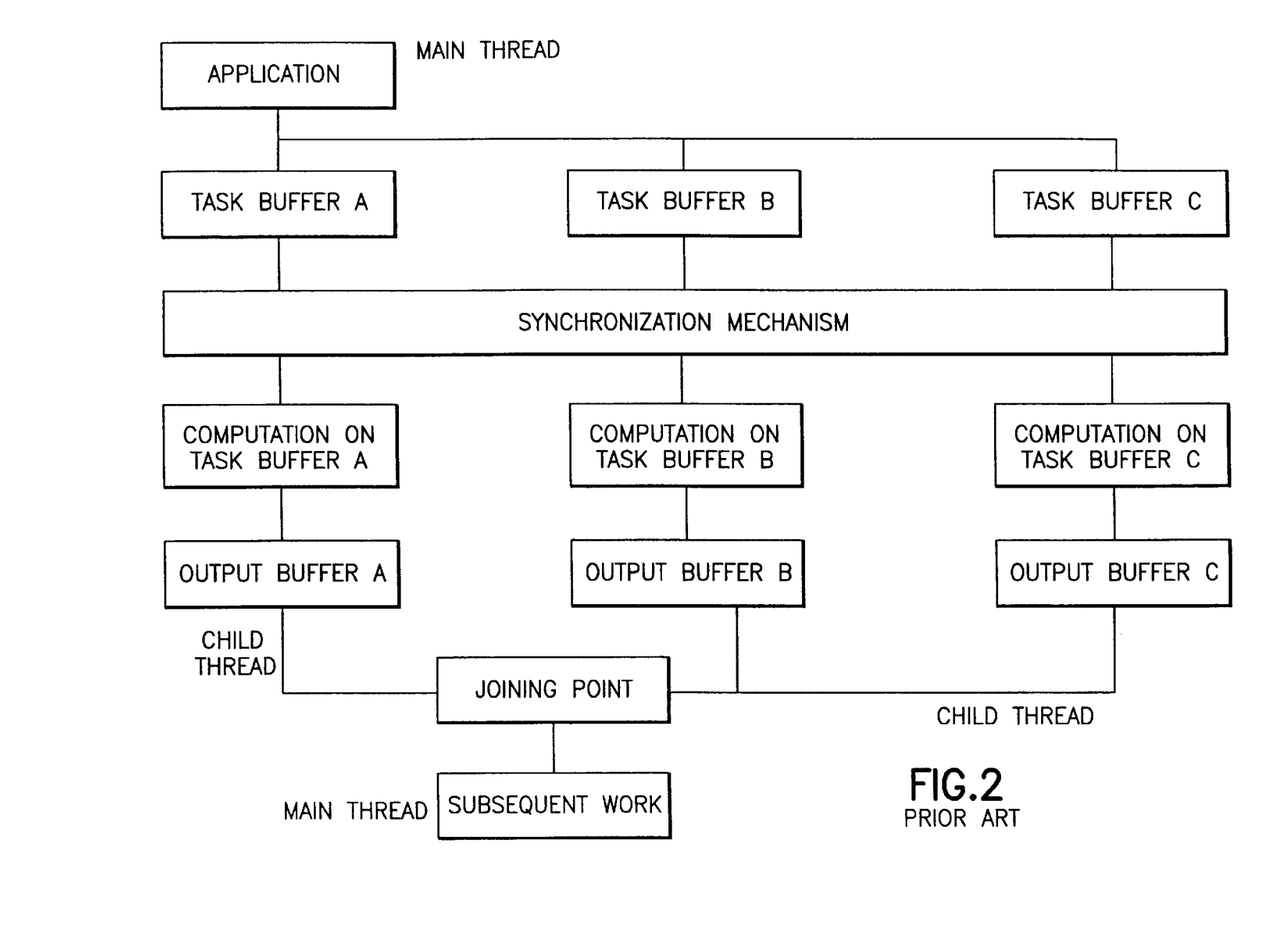
FIG. 2 depicts a conventional technique to partition a task into a plurality of concurrently executed threads.

FIG. 2 conceptually depicts the overall structure of an exemplary application executing a task in parallel, wherein a main thread and a child thread perform the necessary work in a cooperative manner. The main thread gathers work from the application and stores it into work buffers (Task Buffers A–C), and the child thread executes the work items stored in the work buffers. If all of the work buffers are filled, and no buffers are available, the main thread assists the child thread by selecting a work buffer and executing the work items in the selected work buffer. This approach ensures that all processors in the system are utilized with the maximum efficiency, since the processor to which the main thread is assigned is not required to idle until a work buffer becomes available. Since the main thread and the child thread may attempt to access a work buffer at the same time, a situation arises that requires synchronization. That is, some mechanism must be provided to ensure that each work buffer is processed only once, either by the main thread or by the child thread, but not by both threads. In addition, it is important to also ensure that work is performed in a finite amount of time, i.e., there should be no situation wherein the main thread assumes that the child thread will process the work buffer, and vice-versa, as the occurrence of such a situation may cause the work items in the work buffer to never be processed.

Traditionally, synchronization is accomplished by using synchronization primitives provided in the thread library. One example of a thread library is known in the art as the POSIX Pthreads library (see IEEE Standards Project: Draft Standard for Information Technology—Portable Operating System Interface (POSIX) Amendment 2: Threads Extension [C Language] Tech Report P1003.4a Draft 7, IEEE Standards Department, Apr. 23, 1993).

Before claiming a resource a thread must typically first obtain a lock on the resource. By definition, when obtaining the lock the thread knows that no other thread owns the lock for the resource, and that the thread is thus free to use the resource. If a second thread desires to claim the resource, it must wait to obtain the lock until the first thread is finished using the resource. When the first thread finishes using the resource it releases the lock for the resource, thereby allowing other threads to access the resource.

One drawback to the use of this technique is that typically slow lock functions that are defined in the thread library must be executed. Moreover, in actual implementations, the execution of a lock function requires that a request be made for the services of the operating system, which can be a very slow process. Such time penalties are magnified when the work to be performed with the critical resource is itself not very time consuming. Thus, for an application that requires the use of fine-grained synchronization, it is typically not cost effective to use the synchronization primitives provided with the thread library.

OBJECTS OF THE INVENTION

It is a first object of this invention to provide a solution to the foregoing and other synchronization-related problems, and to provide an improved synchronization technique for use in a fine-grained synchronization application.

It is a further object of this invention to provide a synchronization system and method for enabling the use of multiple threads in a graphics pipeline of an image rendering system.

SUMMARY OF THE INVENTION

The foregoing and other problems are overcome and the objects of the invention are realized by methods and apparatus in accordance with embodiments of this invention.

In a multiprocessor system, such as a graphics data processing system, a method is disclosed for processing input data in a data processor pipeline. The method includes steps of operating a main thread to store input data in an input buffer until the input buffer is full or the input data ends. If a child thread does not exist, the method creates a child thread and assigns the input buffer to the child thread for processing. If a child thread already exists, the method determines if the child thread can be assigned the input buffer and, if so, then assigns the input buffer to the child thread for processing. If the child thread cannot be assigned the input buffer for processing, the main thread assigns the input buffer to itself for processing in parallel with processing being performed by the child thread. More than one child thread can be created and so operated, thereby providing a high degree of parallelization of the geometry subsystem. The steps of assigning and determining need employ only local variables that are accessible to both the main thread and the child thread, and that do not require an operating system call to change and/or test.

The method includes a further step of sending a processed data buffer to a subsequent processing stage of the pipeline, such as a rasterizer unit. In accordance with a preferred embodiment of this invention the step of sending the processed buffer is executed only by the child thread, whether the data buffer was processed by the child thread or by the main thread.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

By way of introduction, the use of multiple threads in the graphics pipeline and rasterizer components of a rendering library is considered. In the context of the use of multiple threads, a consideration is also made of the structure of the graphics process and the overall model of parallelism that is used.

Figure 3:
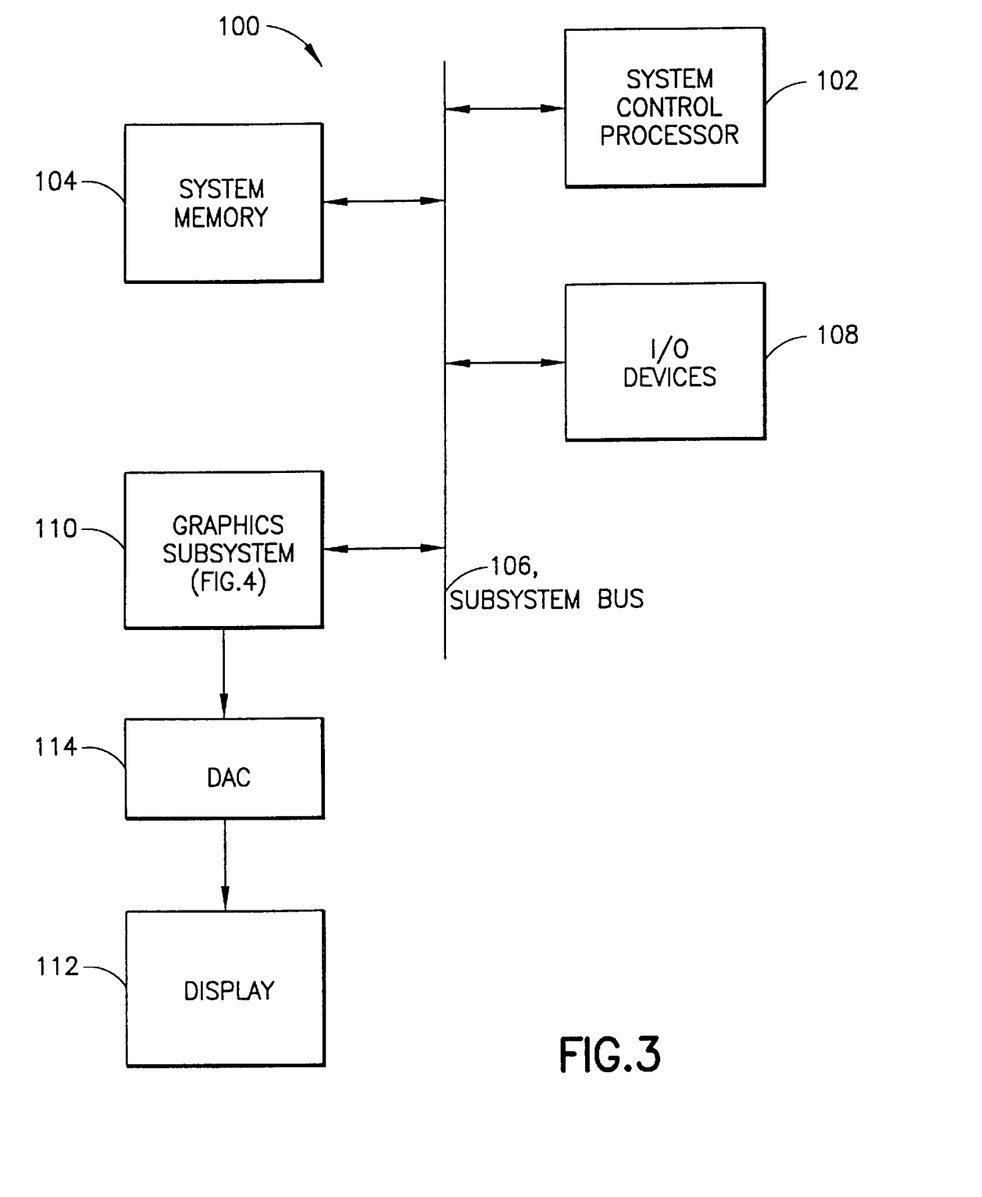
FIG. 3 is a block diagram of a graphics processing system that is suitable for practicing this invention.

The overall architecture of an exemplary graphics processing system 100 that is suitable for practicing this invention is depicted in FIG. 3. As is shown, the graphics processing system 100 includes a system control processor 102 which is coupled to a system memory 104 via a system bus 106. The system memory 104 includes random access memory (RAM) that stores graphics data defining objects contained in one or more three dimensional models/views. The system memory 104 also stores an application program running on the system control processor 102 that provides a user-interface to navigate through and/or modify the three-dimensional models/views defined by the graphics data stored in the memory 104. The graphics data that defines each object includes coordinates and attributes (e.g. color) of primitives. The primitives are geometric entities such as a solid, line, or surface. Typically, the primitives are triangles defined by three vertices. In this case, the system memory 104 includes an ordered list of vertices for triangles that define the surfaces of objects that make up a three dimensional view. In addition, the system memory 104 may store a list of primitive identifiers that correspond to each of the primitives, and transformation matrices that specify how and where the primitives are to be displayed. Input/output (I/O) devices 108 interface to the system control processor 102 via the system bus 106. The I/O devices 108 may include one or more of a keyboard, template, or touch pad for text entry, a pointing device such as a mouse, trackball, or light pen for user input, and speech recognition for speech input.

The graphics processing system 100 also includes a graphics subsystem 110 that interfaces to the system memory 104 via the system bus 106. The graphics subsystem 110 is of most interest to the teachings of this invention, and is shown in greater detail in FIG. 4. Generally, the graphics subsystem 110 operates under command from the application program to render the graphics data stored in the system memory 104 for display as an array of pixels in a display area of a display device 112. The display device 112 may utilize raster scan techniques or liquid crystal display techniques to display the pixels. The pixel data generated by the graphics subsystem 110 is in digital form and, typically, the display device 112 requires the pixel data in analog form. In this case, a digital-to-analog converter (DAC) 114 can be placed between the graphics subsystem 110 and the display device 112 to convert the pixel data from the digital to the analog form that is suitable for driving the display device 112.

Figure 4:
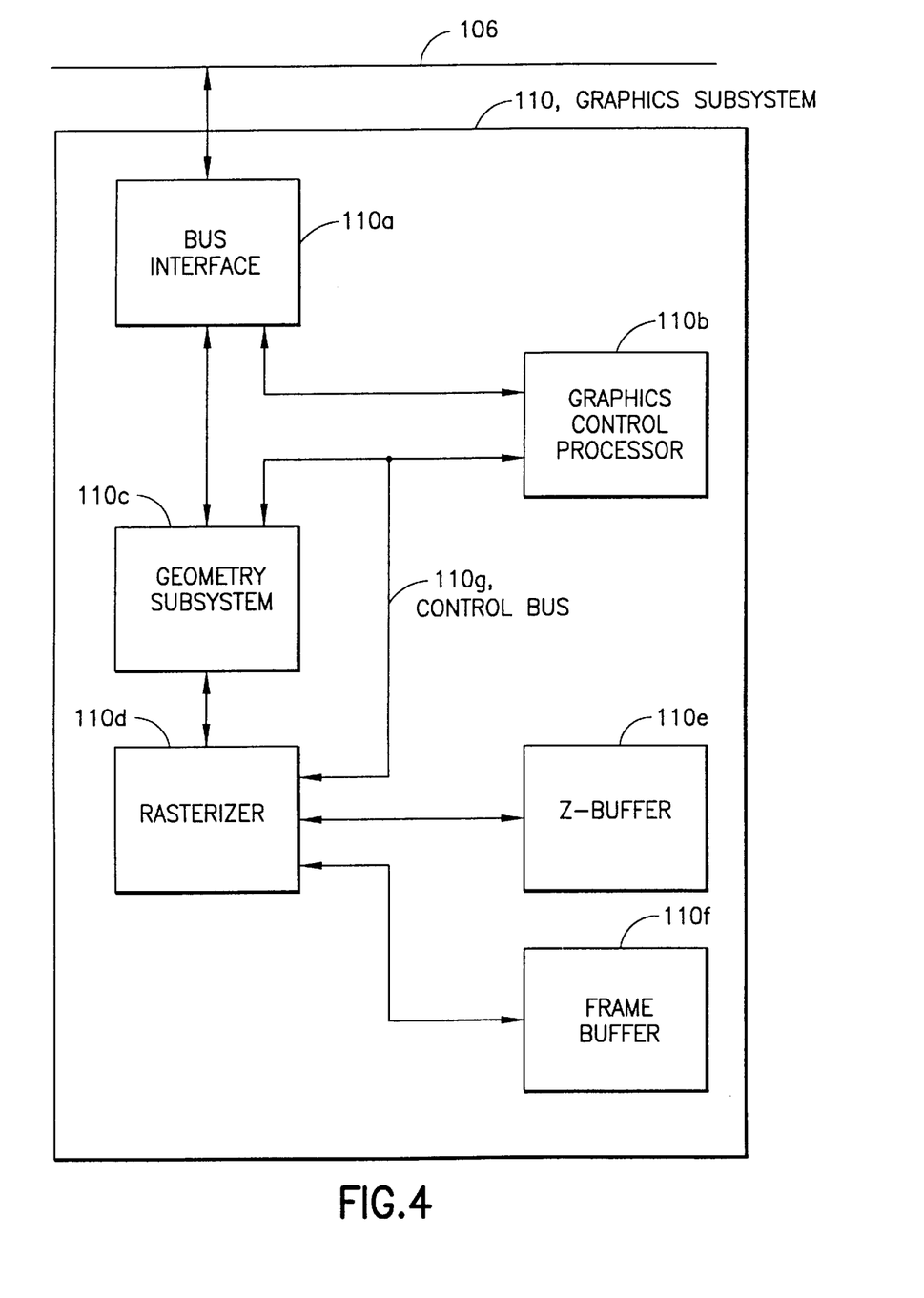
FIG. 4 shows in greater detail the graphics subsystem block of FIG. 3.

Referring to FIG. 4, the graphics subsystem 110 includes a control unit or graphics control processor 110b that supervises the operation of the graphics subsystem 110. Upon receiving a graphics order to render a scene, the control unit or graphics control processor 110b passes the graphics data associated with the graphics order on to a rendering engine or geometry subsystem 110c. The rendering engine 110c transforms the graphics data associated with the graphics order from the model coordinate system to a view coordinate system and clips the graphics data against a predetermined view volume. In addition, depending upon the shading algorithm to be applied, an illumination model is evaluated at various locations (i.e., the vertices of the primitives and/or the pixels covered by a given primitive). The transformed and clipped graphics data is then passed on to a rasterization stage 110d that converts the transformed primitives into pixels, and generally stores each primitive's contribution at each pixel. The rendering engine 110c may be organized in a variety of architectures. A more detailed discussion of such architectures may be found in Foley et. al., "Computer Graphics: Principles and Practice", pp. 855–920 (2nd Ed. 1990). In a presently preferred embodiment the rendering engine 110c is implement as a multi-thread parallel processor.

As is conventional, a frame buffer 110f stores pixel data that represents the color for each pixel of the display device 112 of FIG. 3. The pixel data is periodically output from the frame buffer 110f for display on the display device 112. Preferably, the frame buffer 110f is arranged as a matrix of rows and columns each n bits deep. The particular row and column address typically corresponds to a pixel location in the display area of the display device 112. For example, the (row,column) address of (0,1) may correspond to the pixel at location (0,1) of the display device 112. Each row typically represents the pixels of a particular scan line of the display device 112, and each column typically represents the pixels aligned along vertical lines of the display device 112. The n bits at each pixel address encode information pertaining to the pixel. For example, the n bits stored at each pixel address in a Z-buffer 110e represent the depth of the object visible at that pixel.

The graphics subsystem 110 may include two frame buffers, wherein one of the frame buffers serves as the active display portion, while the other frame buffer is updated for subsequent display. Either frame buffer may change from being active to inactive in accordance with the needs of the system 100, however the particular manner in which the changeover is accomplished is not relevant to the present invention.

Moreover, if the organization of the frame buffer 110f does not correspond to the display area of the display device 112, a scaling operation can be performed on the pixel values stored in the frame buffer 110f, thereby shrinking or enlarging the image stored in the frame buffer. Scaling up may be obtained by duplicating pixel color values or by performing linear or bilinear interpolations between color values to fill gaps between the original pixel values stored in the frame buffer 110f. Scaling down may be obtained by averaging color values of adjacent pixels.

Discussing FIG. 4 now in greater detail, the common graphics subsystem 110 includes the graphics control processor 110b that supervises the operation of the graphics subsystem 110. The graphics control processor 110b controls the operations performed by the other elements of the graphics subsystem 110 via a control bus 110g. The graphics subsystem 110 attaches to the system bus 106 via a bus interface 110a, which reads data from and writes data to the system bus 106 in accordance with the communication protocol of the system bus 106.

The graphics subsystem 110 includes the geometry subsystem 110c and the rasterizer 110d coupled to the bus interface 110a. The rasterizer 110d is coupled to the Z-buffer 110e and the frame buffer 110f. The geometry subsystem 110c performs transformation and clipping operations on the graphics data. More specifically, the geometry subsystem 110c, if need be, transforms the graphics data from the intrinsic coordinate system of the model as stored in the system memory 104 into a world coordinate system. This may be done by transforming the vertices of each primitive with a single transformation matrix that is the concatenation of a plurality of modeling transformation matrices. In addition, one or more surface normal vectors associated with each primitive or vertex (depending upon the shading method to be applied) may need to be transformed.

The geometry subsystem 110c may also perform a viewing transformation on each primitive which transforms the coordinates of the primitive from the world coordinate system to a view coordinate system. The origin of the view coordinate system preferably lies in the center of the viewing window. In the case where the graphics data is composed of vertices of triangles, the viewing transformation operation results in a list of the vertices of the triangles in the view coordinate system. In addition, the geometry subsystem 110c also preferably performs a perspective projection on the view coordinates of each primitive to provide for perspective foreshortening. A more detailed description of the transformation operations of the geometry subsystem 110c may be found in Foley, Van Dam, Feiner and Hughes, Computer Graphics Principles and Practice, pp. 201–281, 866–869 (2nd Ed. 1990).

The geometry subsystem 110c may also perform a clipping operation, wherein the primitives are clipped against a clipping volume to define those portions of the transformed primitives that are potentially visible. In addition, the geometry subsystem 110c maps the coordinates of the vertices of the primitives output from the clipping operation to a normalized device coordinate system as required by the rasterizer 110d. The result of this step in the rendering pipeline is a list of vertices in the normalized device coordinate system that describe potentially visible portions of the primitives. A more detailed description of the clipping operation may be found in Foley, Van Dam, Feiner and Hughes, Computer Graphics Principles and Practice, pp. 110–132, 924–945, 869–870 (2nd Ed. 1990).

In addition, the graphics subsystem 110 may perform lighting calculations that simulate the effects of light sources on the surfaces of the objects of the three-dimensional view/model. Typically, the lighting calculations depend upon (a) the properties of the viewer, (b), the properties of the objects being rendered, and (c) the properties of one or more light sources. Properties of the viewer may include the position of the viewer with respect to the objects being rendered. The properties of the objects may include the location and normal vector of each vertex of the triangles that define the objects. And the properties of the light sources depend upon the type (ambient, directional, spotlight, etc.) and may include intensity, color, direction, attenuation factors, and cone angle). A more detailed description of the steps for carrying out such lighting calculations may be found in Foley, Van Dam, Feiner and Hughes, Computer Graphics Principles and Practice, pp. 721–814 (2nd Ed. 1990).

Typically, lighting calculations are performed once during the rendering process for every vertex of the triangles of the objects of the view. Thus, lighting calculations may be performed by the geometry subsystem 110c. However, the lighting calculations may be calculated for every pixel. Typically, this is accomplished in conjunction with shading calculations performed by the rasterizer 110d. In this case, the lighting calculations are embedded into the shading calculations performed by the rasterizer 110d.

The operation of the rasterizer 110d may be divided into three tasks: scan conversion, shading, and visibility determination. Scan conversion decomposes the potentially visible portion of the primitives into individual pixels. Shading computes the colors of each pixel. Visibility determination utilizes the z coordinate (or depth value) of the primitive at each pixel to compute the set of pixels which are "visible" for the primitive. Thus, for each pixel covered by a potentially visible portion of a primitive, the rasterizer 110d produces pixel information, e.g. color and depth of the primitive, and when appropriate writes the color information and depth of the primitive at the given pixel to the corresponding location in the frame buffer 110f and Z-buffer 110e, respectively. A more detailed description of the operation of the rasterizer 110d may be found in Foley, Van Dam, Feiner and Hughes, Computer Graphics Principles and Practice, pp. 649–720, 870–871 (2nd Ed. 1990), and in U.S. Pat. No. 4,805,116 to B. C. Liang et al., which is commonly assigned to the assignee of the present invention, herein incorporated by reference in its entirety.

Having thus described the overall architecture of a suitable graphics rendering engine, it is noted that there are three main components in a single thread of graphics rendering, referred to herein as State Management, Geometry Calculations, and Rasterization.

The State Management functions modify the rendering parameters such as line width, light positions, viewer positions, etc. The State Management functions should be clearly demarcated as affecting either the geometry calculations, rasterization calculations, or both. State variables are stored on the appropriate processor, e.g., the state associated with geometry calculations is stored on the processor performing the geometry calculations.

The input to the Geometry Calculations functions is a set of vertices with data specified in modeling coordinates. The geometry calculations involve coordinate transformation from modeling coordinates to normalized device coordinates (NDC), clipping, lighting, texture and fog evaluation. The end result is a set of vertices which need to be assembled into primitives that the rasterizer supports.

The Rasterization functions involve conversion of primitives defined in NDC space into fragments, performing pixel operations on the fragments, and updating the destination buffer (either the frame buffer itself or a pixel map).

With regard to partitioning the necessary graphics work, it should be noted that in many situations an application has only one graphics context and only one thread. In order to parallelize such an application a traditional approach taken by graphics accelerators can be applied.

The graphics data stream has an essentially serial nature. Thus, traditional parallel graphics architectures have used the pipeline model of parallel computation. This is similar to instruction level parallelism in superpipelined processors. In this approach the graphics pipeline is broken into the above sequence of well demarcated operations (i.e., State Management, Geometry Calculations, Rasterization) and is executed on different processors.

While this approach has been generally successful, it has been found that a significant amount of the total processing time is spent in data movement from one processor to another, since the processors do not share an address space. Thus, more recent work has concentrated on using data parallelism in addition to pipelining. This is similar to the approach taken with superscalar processors which exploit data parallelism with multiple execution units. Techniques such as the use of the completion buffer in the PowerPC 604 have been implemented to permit out-of-order execution and subsequent synchronization. This is due in large part to the fact that the graphics primitives have to be rendered in the order specified by the application. However, there are other techniques for exploiting data parallelism, using mutual exclusion in window space, for rasterization.

All State Management functions are inherently sequential. In addition, each State Management function indirectly implies a synchronization step. Moreover, the State Management functions typically modify state variables and function pointers and are therefore not computationally intensive. Since it is not apparent that much would be gained by parallelizing the State Management functions, it is preferred that most state management functions be performed sequentially. The cases of matrix and material changes are handled with a little more caution in a parallel manner. This may be done by copying the matrix state into the state for the vertex buffers.

With regard to the Geometry Calculations functions, many popular graphics interfaces, such as the OpenGL interface, are rather fine-grained and send small amounts of geometry data (e.g., a vertex at a time) from the application to the rendering code. Therefore, data parallelism at a vertex level, when data is received from the application, is not practical. As a result it is typically necessary to buffer the input geometry data before any useful parallelism can be exploited. The buffering process is in itself inherently sequential.

In theory, after data for several vertices from the application have been buffered, the vertices could be distributed among the processors and the transformation, lighting, texture and fog calculations could be done in parallel for each vertex. However, this approach has been found to result in poor performance because the grain of the parallelism was too low.

As such, it is preferred for this invention that the buffering thread copy the current color, texture, and surface normal coordinates as necessary into the vertex data structure, and store the vertex in a buffer. The buffering thread also flushes the vertex buffer when State Management calls, other than vertex related data, are encountered. The buffering thread also adds this buffer to a queue of buffers for a given context (or application level thread). Another thread or set of threads is used to grab the buffer from the queue and complete the remainder of the work, such as lighting, texturing, conversion to NDC coordinates, etc., before handing the buffer to the rasterizer.

Figure 5:
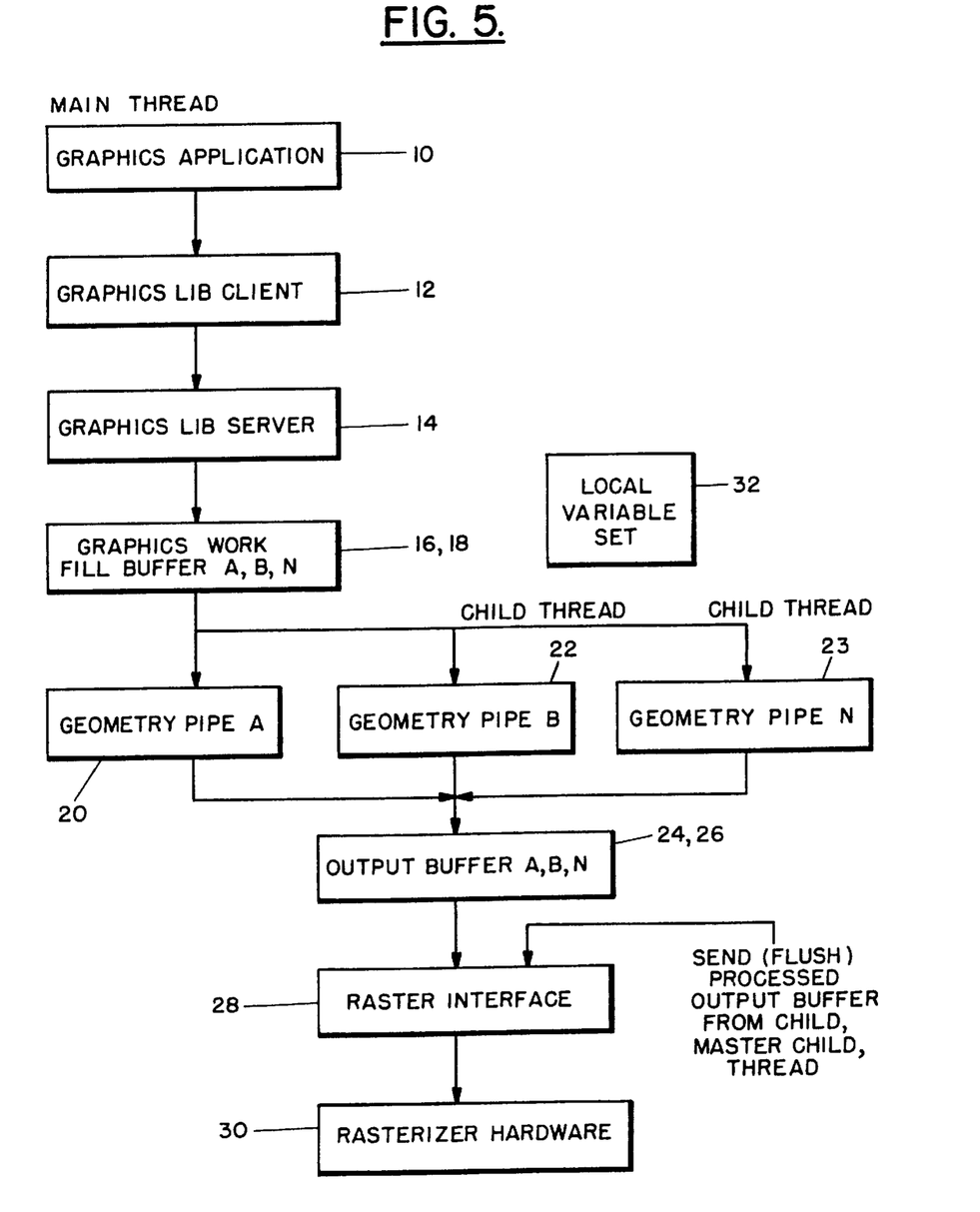
FIG. 5 illustrates a graphics task that is partitioned and executed in accordance with a preferred embodiment of this invention.

FIG. 5 depicts the overall process, wherein a Graphics Application 10 has an associated Graphics Library Client 12 and a Graphics Library Server 14. Input Graphics Work buffers, such as vertex buffers 16, 18 . . . N provide sub-tasks to a main thread and to N child threads, each having an associated Geometry Pipeline 20, 22 . . . 23, and an associated Output Buffer 24, 26 . . . N. The Output Buffers 24, 26 . . . N feed the results of geometry calculations to a Rasterizer Interface 28 and thence to the Rasterizer Hardware 30. In general, Blocks 10–14 correspond to the Graphics Control Processor 110b of FIG. 4, Blocks 16–26 correspond the Geometry Subsystem 110c of FIG. 4, and Blocks 28 and 30 correspond to the Rasterizer 110d of FIG. 4.

FIG. 5 also illustrates a local variable set 32 that stores variables flags that can be set, reset, and tested by either the main thread or the child threads, as described in detail below. The local variable set 32 may be resident in the cache memory associated with each of the cooperating processors (see FIG. 1), and in this case cache coherency or some other suitable mechanism is used to insure that the main thread and the child thread always have access to the same variable states.

The teachings of this invention provide a method for parallelizing software graphics (either two dimensional or three dimensional) rendering geometry pipelines to obtain significant performance gains through the use of a unique load balance scheme. The load balancing scheme employs an optimal number of vertex buffers and a technique which partitions and decouples the pipeline serial processing steps into parallel processing steps. Each individual pipeline parallel processing step has its own counter and flags, and each user thread also has its own counter, flags and an optimal number of flush buffers to eliminate the use of any time-consuming thread synchronization functions. A method is also provided to share work buffers between two threads without invoking lock/unlock functions in the thread library, by using variables that are only visible to the threads participating in the application.

When sharing tasks on a parallel data processor it becomes necessary to ensure that cooperating processes process a task within a finite time, while also ensuring that the task is performed only once by one process. In an illustrative example two processes, namely main and child, are used to perform a task, such as one of the geometry calculation tasks referred to above. It does not matter which process actually performs the task, so long as the task is performed but once and within a predetermined (finite) amount of time.

In an exemplary embodiment of this invention the following variables (Table 1) are used: mvb is the index of the current buffer being dealt with by the main thread; cvb is the index of the current buffer being dealt with by the child thread; and mflag[b] and cflag[b] are variables used for synchronization and can take four possible values, empty, full, main or child. The main thread can only change the values of mflag[b] and cflag[b] from empty to main or child (see Table 2), and can also change the value of mflag[b] from empty to processed. The child thread can change the value of mflag[b] from processed to empty and cflag[b] from child to empty. A variable owner[b] is used to indicate which thread, main or child, is processing the buffer b. Variables owner[b] and state[b] can be assigned only by the main thread. A variable state[b] is used to indicate how a buffer was filled, either due to reaching a maximum size of the buffer or by receiving a glEnd function call that ends the current geometric primitive being processed by the application. These variables, including flags, are preferably stored in the local variable set 32 where they are accessible to the main thread and the child thread(s) without the necessity of making an operating system call.

TABLE 1

| Variable | main thread | child thread |
| --- | --- | --- |
| vertex buffer # | mvb | cvb |
| vertex buffer | mflag{mvb}, | cflag[cvb], |
| flag | cflag{mvb} | mflag[cvb] |
| owner | owner[mvb] | owner[cvb] |
| state | state[mvb] | state[cvb] |

The following operations can be performed by the main and child thread on the variables.

TABLE 2

| Thread | mflag | cflag | owner | state |
| --- | --- | --- | --- | --- |
| main | main | main | main | end |
|  | child | child | child | full |
|  | processed |  |  |  |
| child | empty | empty |  |  |

The flow charts of FIGS. 6A, 6B and 6C, and FIGS. 7A and 7B, illustrate the operation of the main and child threads, respectively, in accordance with the teachings of this invention, and depict the flow of control in the parallelization of the geometry pipeline. It should be noted that in a presently preferred embodiment of this invention only the child thread sends (flushes) processed vertex buffers down to the rasterizer 110d. Either the main thread or the child thread may process the vertex buffers.

Figure 6A:
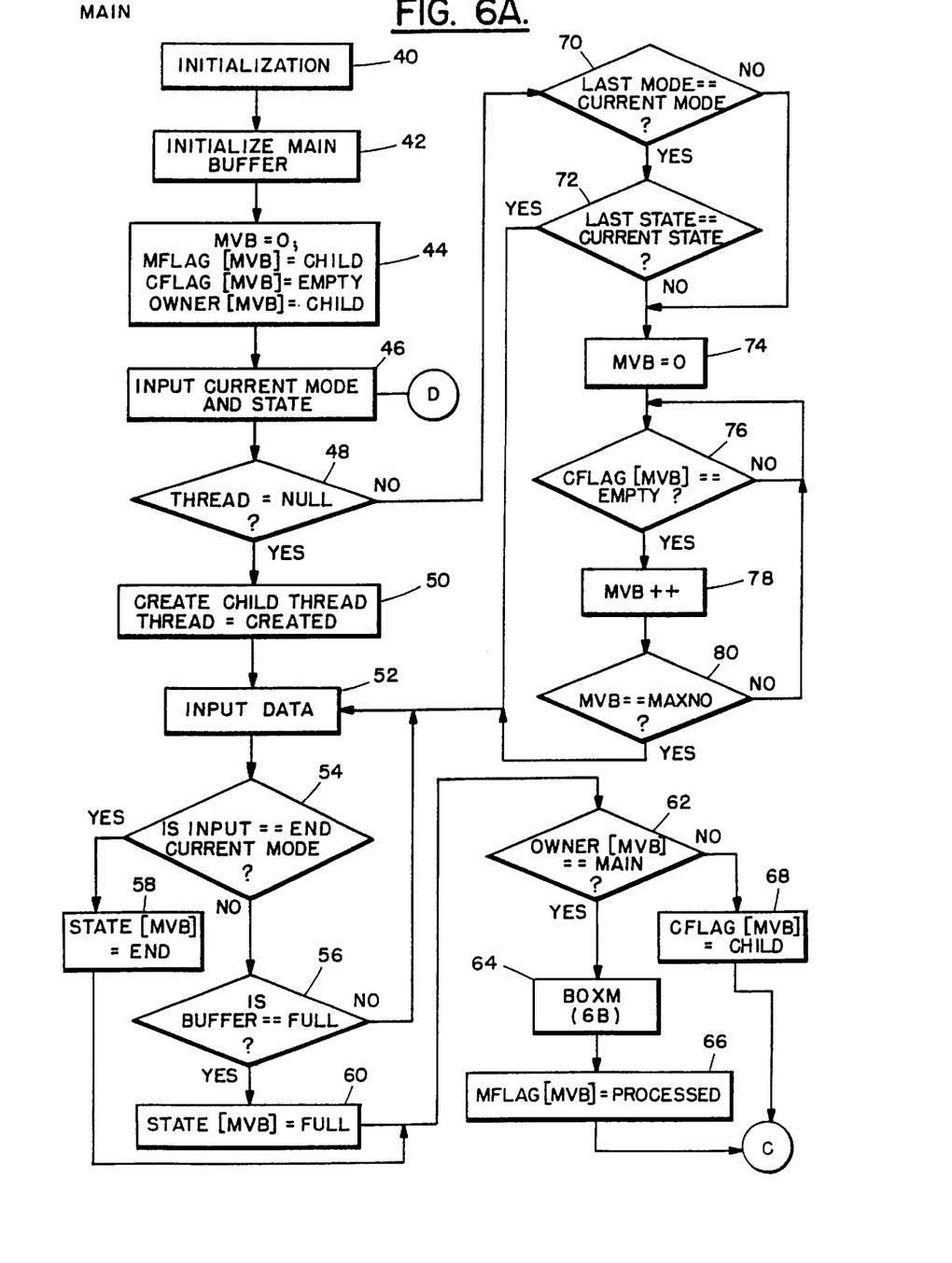
FIGS. 6A, 6B and 6C, and FIGS. 7A and 7B, are logic flow diagrams illustrating the operation of main and child threads, respectively, and depict the flow of control in the parallelization of a geometry pipeline.
Figure 6B:
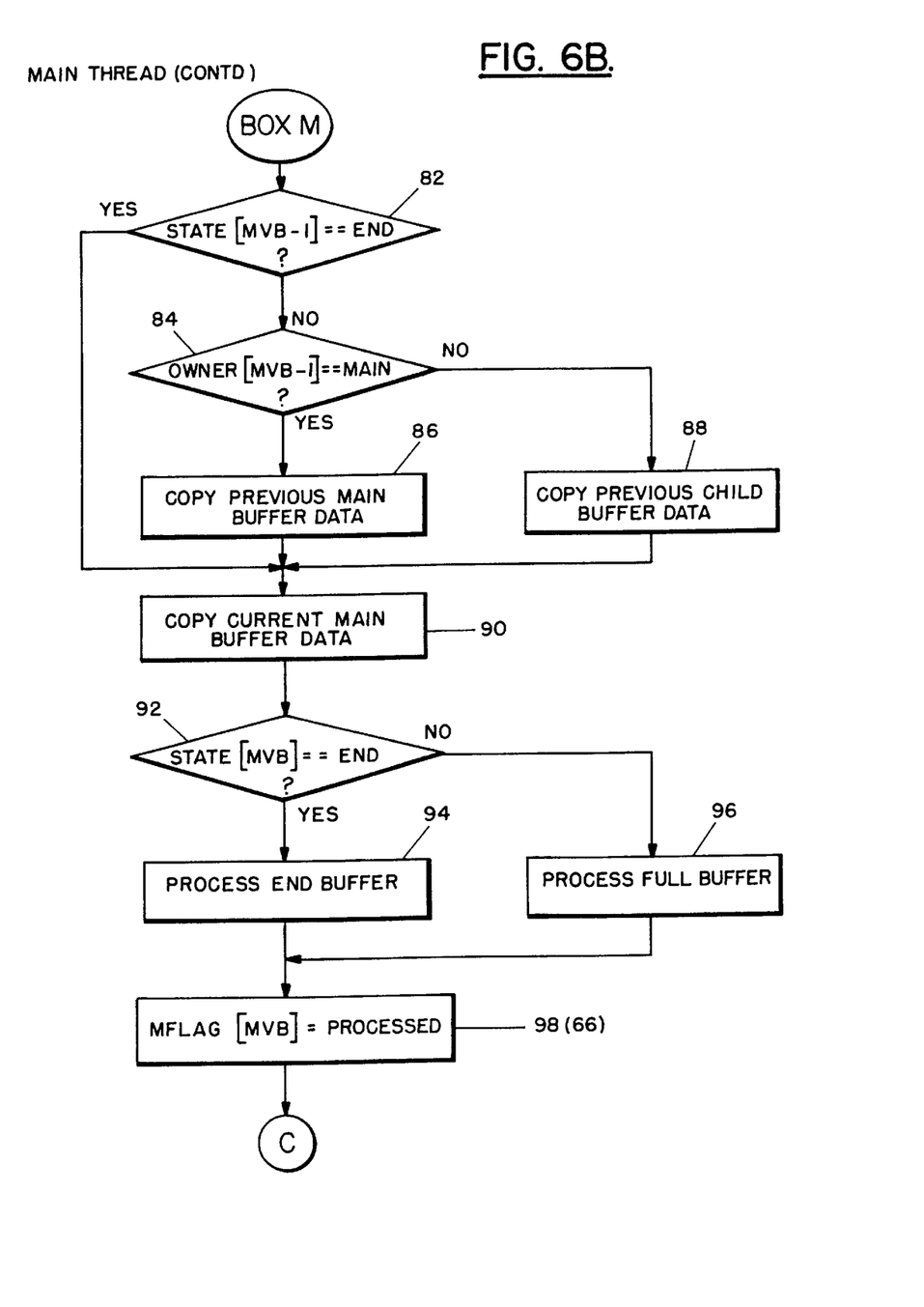
Figure 6C:
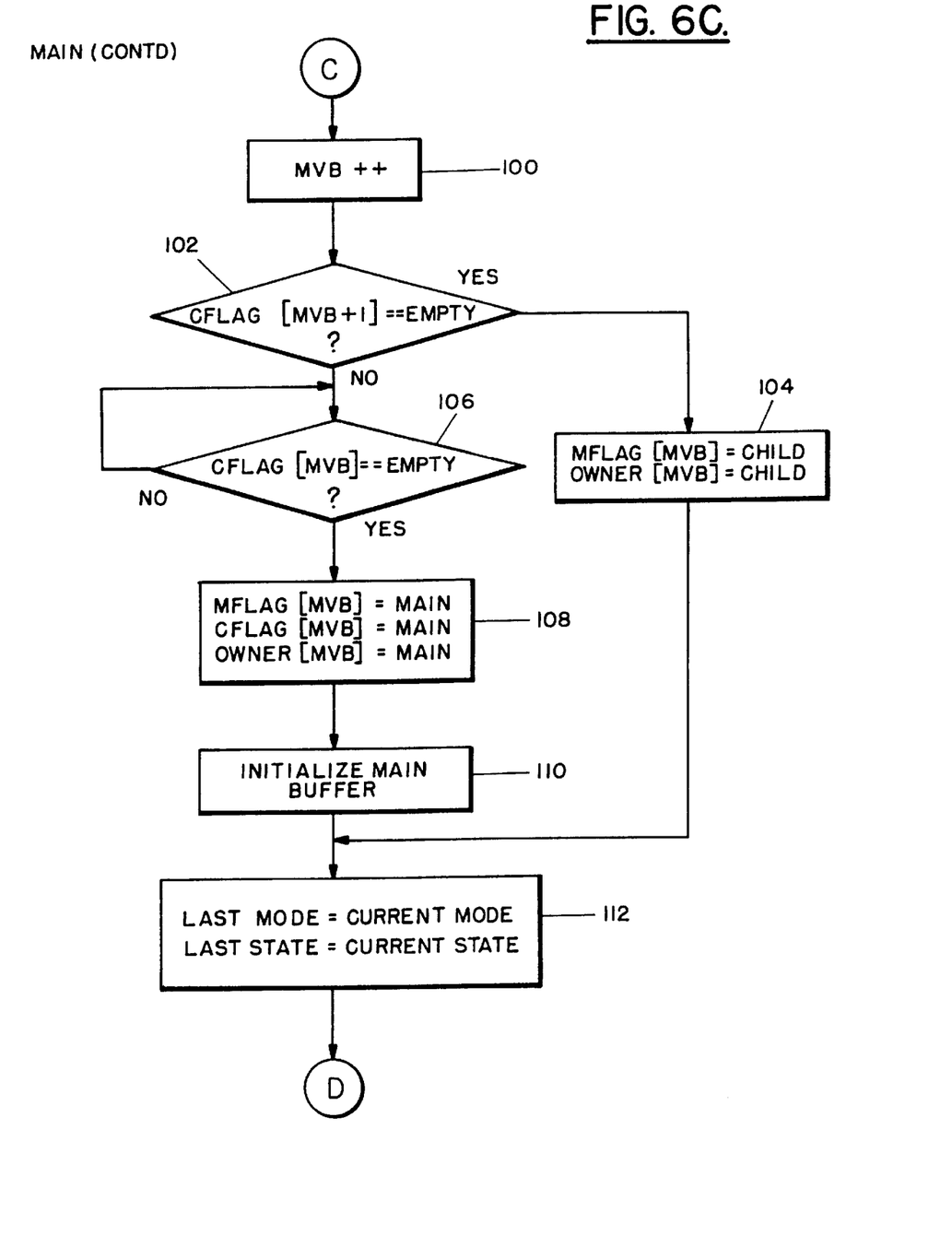

A description is now made of the main thread flowchart of FIGS. 6A–6C.

In FIG. 6A the main thread starts by initializing the data structures needed (steps 40–44). The main thread then begins to accept state commands until a non-state command arrives (step 46). State commands in this context are a description of the overall state of the geometric processing operation, and may include a type of polygon, color(s), lighting direction, etc. That is, state commands contain the information required by the main and child threads to correctly process the vertex data. The non-state commands can include the vertex data (geometric input data) that is to be processed. The state commands are stored in a memory area that is accessible by the main thread and the child thread(s), while the vertex data is stored in one or more vertex data input buffers 16, 18.

If no child thread has been created (step 48), a child thread is created (step 50). The child thread then begins executing as described in the child thread flow charts of FIGS. 7A and 7B (described below). The main thread then begins to accept geometric input data (step 52) and initiates filling a vertex buffer 16 (steps 54, 56, 58, 60). Once the vertex buffer is either full, or the filling terminated by the application, the vertex buffer is processed either by the main thread or by the child thread (steps 62, 64, 66, 68) as described in detail below.

If a child thread has already been created at the time the above non-state commands begins to arrive (step 48), control passes to steps 70, 72 where a determination is made if new state commands have arrived since the last vertex buffer was processed. The arrival of new state commands implies that geometric processing is to proceed using new parameters (e.g., the color, viewpoint, and/or lighting direction may have been changed). If no such commands have been received the main thread returns to step 52 to accept geometric input data. However, if unprocessed state commands exist, the main thread instead loops through all of the vertex buffers and waits for all of them to be emptied (steps 74, 76, 78, 80). This allows the processing of the pre-existing vertex data to be completed using the parameters embodied in the previous state commands. Once all of the vertex buffers are emptied the main thread transitions from step 80 back to step 52 to again begin accepting geometric input data.

If the input buffer was assigned to the main thread, i.e., mflag[mvb]==main at step 62, the main thread processes the buffer as shown in FIG. 6B (steps 82–98, note that step 98 of FIG. 6B and step 66 of FIG. 6A are the same step), and then control passes to step 100 of FIG. 6C. Control also passes to step 100 for the case where the buffer was instead assigned to the child thread (steps 62, 68). In FIG. 6C the main thread determines who will be assigned the next physical vertex buffer. At step 100 the buffer counter mvb is first incremented. If the child thread is not busy with the 'next to next' physical vertex buffer from the last round of distribution, the main thread knows that the child thread processing is proceeding normally, and that the child thread does not have a backlog of buffers to process (step 102). In this case the main thread assigns the next physical vertex buffer to the child thread (step 104). However if the child thread is still processing the above said buffer (next to next physical vertex buffer), the main thread then determines if the child has emptied the mbv$^{th}$ buffer by checking if cflag[mvb] ==empty (step 106). If the child thread has not emptied this buffer, the main thread delays until at least one buffer is freed (emptied) because, in this situation, there is no empty buffer to receive new geometric input data. The main thread stays in the loop (steps 102, 104) until the child thread processing catches up. If the main thread determines that the child thread has a significant backlog of buffers, i.e., cflag [mb+l] is not empty and cflag[mvb] is empty, it assigns the next buffer to the main thread (step 108), initializes the next buffer (step 110), and updates the mode and state variables (step 112). The main thread then returns to step 46 (FIG. 6A) to input the current mode and state, and processing then continues by the main thread receiving state information and geometric input data (step 52).

Figure 7A:
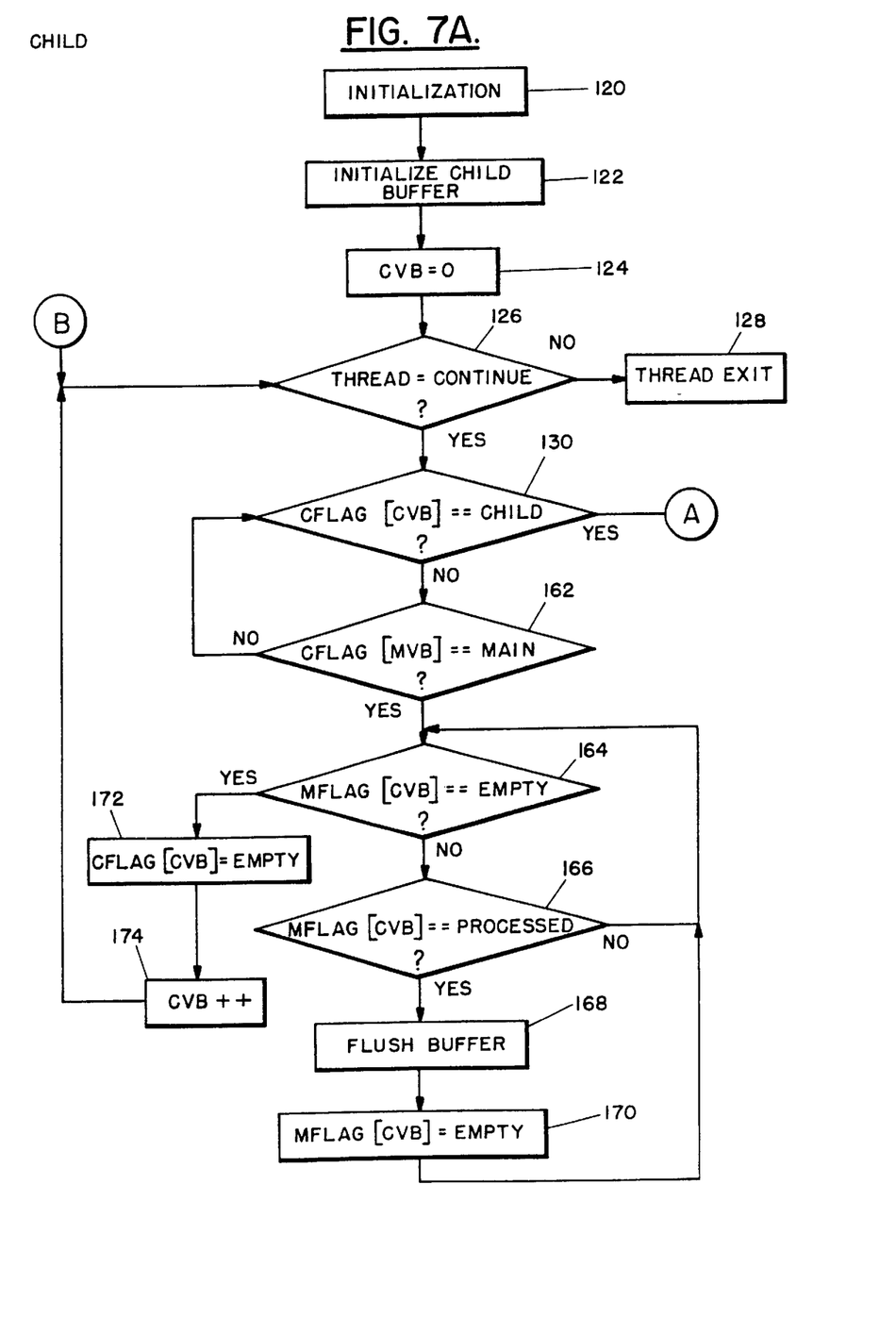
Figure 7B:
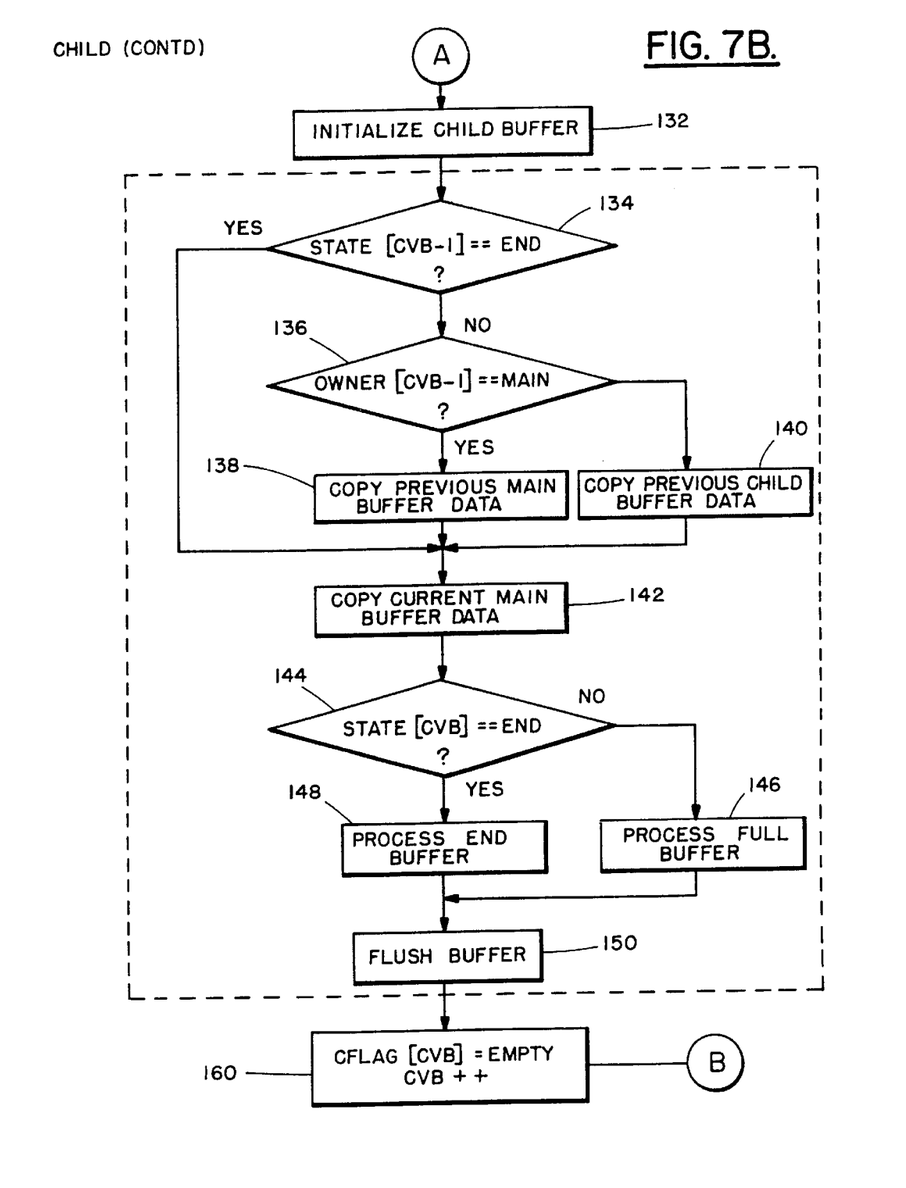

A description is now made of the child thread flow chart of FIGS. 7A and 7B.

After the child thread is created (step 50 of FIG. 6A) it performs an initialization procedure that includes initializing data structures and the child buffer (steps 120, 122, 124). A step 126 the child thread determines if it can continue. If no, control passes to step 128 where the child thread exits and terminates. If the child thread can continue control passes instead to step 130 where child thread continually checks to see if there is an input buffer assigned to it, i.e., if cflag [cvb]==child.

If such a buffer exists, control passes via connector A to FIG. 7B where the child buffer is initialized (step 132) before entering the buffer processing state. First a check is made at step 134 if state[cvb-1] ==end, i.e., the circumstances under which the previous buffer was completed (e.g., did the previous buffer end due to a GLEND.) If yes, control passes to step 142, else control passes to step 136 where the child thread determines who processed the previous buffer, i.e., was the previous buffer owned by the main thread or by the child thread. At steps 138 and 140 the child thread copies data from the previous physical vertex buffer if there is a need for such copying. At step 142 the child thread copies the current main buffer data, and at step 144 checks to see if state[cvb] ==end. If no, the buffer is assumed to be full and is processed as same in step 146, else the vertex buffer is identified as being the end (last) buffer, and may not be completely full. Processing in this case proceeds at step 148. After the buffer is processed it is flushed by the child thread to the rasterizer hardware 110$d$ via the rasterizer interface 28 (step 150). The child thread then indicates that it has emptied the buffer by setting cflag[cvb] =empty, and increments the counter cvb (step 160). Control them passes via connector B back to step 126 of FIG. 7A.

Returning to step 130 of FIG. 6A, if there is no input buffer assigned to the child thread the child thread determines at step 162 whether there is a buffer in sequence that was processed by the main thread. If not, the child thread loops between steps 130 and 162 until either it has been assigned a vertex buffer to process or a vertex buffer has been assigned to the main thread. If it is determined at step 162 that the main thread has been assigned a buffer, then the child thread determines if the buffer is ready to be sent (flushed) to the rasterizer hardware 110$d$. Once a buffer is flushed to the rasterizer 110$d$ it is marked as empty. At step 164 the child thread determines if the main thread buffer is marked as empty (already flushed). If not, control passes to step 166 where the child thread checks to see if the main thread has completed processing its self-assigned vertex buffer. If not, the child thread loops between steps 164 and 166 until the main thread terminates processing of the vertex buffer. If yes at step 166 the child thread flushes the buffer at step 168 and then marks the buffer as empty at step 170. The empty condition is then detected at step 164, and control passes to steps 172 and 174 where the child buffer is marked as empty and the buffer pointer incremented. Control then returns to step 126.

In order to extend this method to more than one child thread, a set of per thread variables, such as cflag, is created. In this situation one of the child threads functions as a master child thread, and only the master child thread can send processed vertex buffers to the rasterizer 110$d$.

The number of vertex buffers used in the system is preferably more than the number of threads in order for the system to be efficient, otherwise several child threads will attempt to process work buffers and some of them will be required to be idle, thus wasting system resources. Preferably, the number of user threads (including the main or initial thread) is equal to or less than the number of microprocessors in the multiprocessor system, and wherein the load on each microprocessor is relatively balanced.

Although described above in the context of a parallel processing system wherein only a child thread can flush a processed buffer, in other embodiments it may be desirable to enable any thread to flush a processed vertex buffer. However, the inventors have determined that the greatest efficiency and use of resources results when only the child thread can flush the completed buffer.

It can be appreciated that in accordance with the techniques described above no thread-explicit synchronization is required, as a method to synchronize the operations of multiple threads employs variables that are only visible to the threads participating in the application. That is, explicit operating system calls and the like are not required, as the synchronization variables are locally available to the main and child thread(s) in the local variable set 32 of FIG. 5.

This invention further teaches a technique wherein the graphic processing pipeline's three serial processing steps are partitioned and decoupled into four parallel processing steps, wherein each individual pipeline parallel processing step has its own counters and flags, and wherein each user thread also has its own counters, flags and an optimal number of flush buffers.

The optimal number of vertex buffers is equal to or less than the minimum number of vertex buffers. This allows each user thread a sufficient number of vertex buffers to be busy most of the time in most pipeline application cases. An optimal number of flush buffers for each thread is furthermore equal to or greater than the optimal number of the shared vertex buffers. The vertex buffers are filled and flushed by the main or initial thread sequentially in a first in/first out basis. Preferably the main or initial thread and the child or user thread fill their mutually exclusive flush buffers sequentially.

It should thus be realized that the problems solved by the teaching of this invention are fundamental in the area of parallel processing, and that the teachings of this invention thus have wide applicability. As such, the teachings of this invention should not be construed to be limited to only the graphics processing application referred to above.

Thus, while the invention has been particularly shown and described with respect to preferred embodiments thereof, it will be understood by those skilled in the art that changes in form and details may be made therein without departing from the scope and spirit of the invention.

What is claimed is:

1. In a multiprocessor system, a method for processing input data in a data processor pipeline, comprising steps of:

operating a main thread to store input data in an input buffer until the input buffer is full or the input data ends;

if a child thread does not exist, creating a child thread and assigning the input buffer to the child thread for processing;

else, if a child thread already exists, determining if the child thread can be assigned the input buffer and, if so, assigning the input buffer to the child thread for processing, otherwise assigning the input buffer to the main thread for processing in parallel with processing being performed by the child thread;

wherein the steps of assigning and determining employ local variables that are accessible to both the main thread and the child thread.

2. A method as in claim 1, and further comprising a step of sending a processed data buffer to a subsequent processing stage of the pipeline, the step of sending being executed only by the child thread whether the data buffer was processed by the child thread or by the main thread.

3. A method as in claim 1, and further comprising a step of sending a processed data buffer to a subsequent processing stage of the pipeline, the step of sending being executed only by the child thread whether the data buffer was processed by the child thread, by another child thread, or by the main thread.

4. A method as in claim 1, wherein the input data is descriptive of vertex coordinates for rendering a geometric image.

5. In a multiprocessor system, a method for synchronizing operations of main thread and at least one child thread, comprising steps of:

operating the main thread to store input data in an input buffer until the input buffer is full or the input data ends;

if a child thread does not exist, creating a child thread and assigning the input buffer to the child thread for processing;

else, if a child thread already exists, determining if the child thread can be assigned the input buffer and, if so, assigning the input buffer to the child thread for processing, otherwise assigning the input buffer to the main thread for processing in parallel with processing being performed by the child thread;

wherein the steps of assigning and determining are synchronized using local variables that are accessible to both the main thread and the child thread without requiring the use of an operating system call.

6. A method as in claim 5, and further comprising a step of sending a processed data buffer to a subsequent processing stage of the pipeline, the step of sending being executed only by the child thread, using the local variables, whether the data buffer was processed by the child thread or by the main thread.

7. A method as in claim 5, and further comprising a step of sending a processed data buffer to a subsequent processing stage of the pipeline, the step of sending being executed only by the child thread, using the local variables, whether the data buffer was processed by the child thread, by another child thread, or by the main thread.

8. A method as in claim 5, wherein the input data is descriptive of vertex coordinates for rendering a geometric image.

9. In a graphics geometry pipeline, a method for processing a data stream of vertex coordinates descriptive of a graphical model to be rendered for display, comprising steps of:

operating a main thread to detect a start of a vertex coordinates data stream associated with a first state of the graphical model;

storing the vertex coordinates data in a first data input buffer until the first data input buffer is full or the input vertex coordinates data stream ends;

determining if a first child thread exists;

if not, creating a first child thread and assigning the first data input buffer to the first child thread for processing;

if the first child thread already exists, determining if the first child thread can be assigned the first data input buffer and, if so, assigning the first data input buffer to the first child thread for processing; and storing further vertex coordinates data in a second data input buffer until the second data input buffer is full or the input vertex coordinates data stream ends;

if it is determined that the first child thread cannot be assigned the first data input buffer, operating the main thread to perform one of, (A) determining if a second child thread exists;

if not, creating a second child thread and assigning the second data input buffer to the second child thread for processing;

if the second child thread already exists, determining if the second child thread can be assigned the second data input buffer and, if so, assigning the second data input buffer to the second child thread for processing;

or, (B) assigning the second data input buffer to the main thread for processing in parallel with processing being performed by at least one of the first and second child threads;

wherein the steps of assigning and determining are synchronized using local variables that are accessible to both the main thread and the first and second child threads without requiring the use of an operating system call.

10. A method as in claim 9, and further comprising a step of sending a processed data buffer to a subsequent stage of the graphics geometry pipeline, the step of sending being executed only by the first child thread, using the local variables, whether the data buffer was processed by the first child thread, the second child thread, or by the main thread.

11. A method as in claim 10, wherein the subsequent stage is a rasterizer stage.

12. A method as in claim 9, and further comprising steps of:

operating the main thread to detect an occurrence of a second state of the graphical model; and completing all processing of the vertex coordinates data associated with the first state of the graphical model.

13. A graphics data processing system, said graphics data processing system being comprised of a plurality of data processors wherein one data processor executes a main thread and at least one second data processor executes a child thread, and further comprising:

memory means for storing a set of local variables that are accessible by both said main thread and said at least one child thread;

a plurality of input buffers for storing an input graphics data stream under the control of said main thread; and processing means associated with said main thread that is responsive to the local variables for assigning input buffers amongst the main and child threads and for synchronizing the operations of the main and child threads so as to execute a graphics data computation task in parallel using data stored in said input buffers.

14. A graphics data processing system as in claim 13, wherein said memory means is comprised of a first cache memory coupled to said first data processor and a second cache memory coupled to said second data processor, each of said first and second cache memories storing an identical copy of said set of local variables.

* * * * *